United States Patent [19]
Anderson et al.

[11] 3,793,890
[45] Feb. 26, 1974

[54] DIGITAL ELECTRONIC INTEGRATING ACCELEROMETER

[75] Inventors: Matthew E. Anderson, Ontario; Stephen L. Redmond, China Lake, both of Calif.

[73] Assignee: The United States of America as represented by the Secretary of the Navy, Washington, D.C.

[22] Filed: May 22, 1972

[21] Appl. No.: 255,746

[52] U.S. Cl. ................. 73/490, 73/503, 235/92 AE
[51] Int. Cl. ........................................... G01p 15/08
[58] Field of Search 73/503, 490; 235/92 NT, 92 AE; 102/78

[56] References Cited
UNITED STATES PATENTS

| | | | |
|---|---|---|---|
| 3,028,550 | 4/1962 | Naydan et al. | 73/503 |
| 3,340,387 | 9/1967 | Anderson | 235/92 NT X |
| 3,069,623 | 12/1962 | Murgio | 73/503 |

*Primary Examiner*—James J. Gill
*Attorney, Agent, or Firm*—R. S. Sciascia; G. J. Rubens; J. W. McLaren

[57] ABSTRACT

An acceleration signal is integrated over a determinable time period to develop a digital count which is a function of velocity; that signal is then again integrated over an identical time period to produce a digital count as a function of the distance traveled during the acceleration periods. The distance signal is compared to a reference signal to determine whether a missile, for example, undergoing the detected acceleration has traveled a sufficient distance from its launching site, or vehicle such as an aircraft, to be safely armed for detonation. A digital distance signal equal to the reference signal affects arming of the missile by aligning an explosive train, for example, for detonation. First and second interlocks in the system are responsive to a ready-to-launch signal and an initial minimum acceleration signal, respectively, to ready the system for arming. The final step of arming is accomplished by a cam driven into arming position by simultaneously actuated drive members which are pivotably attached to the arming cam. If only one of the two drive members is actuated by a spurious signal, for example, the cam is pivotably displaced and locked into a non-armed position.

11 Claims, 6 Drawing Figures

DIGITAL ELECTRONIC INTEGRATING ACCELEROMETER

BACKGROUND OF THE INVENTION

Both prior art and current safety and arming devices as used on missiles, for example, attempt to employ some form of double integration of detected missile acceleration in order to determine safe arming distance beyond which the missile may be safely detonated. Such systems customarily use a mechanical device to perform the iterative integration of missile acceleration. While mechanical devices are relatively rugged, safe, and fairly inexpensive, they also have inherent problems and disadvantages. Because such integration devices are essentially mechanical in nature they inherently suffer undesirable effects from friction, and vibration which detracts from both their accuracy and reliability. Moreover, such mechanical devices incur problems with lubrication and require relatively extreme close tolerances in their manufacture, assembly, and operation.

The cumulative result of these and other disadvantages is that it is not uncommon for safety and arming systems using mechanical integration devices to have to undergo several individual adjustments to enable their performance within required tolerances. With such devices usual accuracies for arming distances are of the order of 20 percent to 25 percent of the actual safe separation distance. Moreover, nearly all acceleration driven integration devices as employed in prior art and present safety and arming systems are only pseudo acceleration double integrators for the reason that mechanical integrators will only provide a reasonably accurate measure of arming distance if the acceleration forces, i.e., the boost levels, remain fairly constant and above about 6 g's in magnitude. This is due mainly to the customary use of a runaway escapement to retard the initially driven arming masses. When missile acceleration approaches zero or becomes negative, the escapement control mechanism no longer continues to integrate the acceleration signals to obtain separation distance but simply stops moving.

Thus, problems have been encountered with the prior art mechanical integrating devices when it is attempted to employ them for other than their specifically designed purpose. For example, when the boost duration time is short or the acceleration-time profile is not adequate, the prior art mechanical integrating devices simply will not function to provide sufficiently accurate output signal. Some effort has been undertaken to develop mechanical devices that will perform a true acceleration double integration function. However, it is questionable whether the size, cost, accuracy, and ruggedness requirements such as are typical of a missile safety and arming system can be fully met by such a mechanical device operating on very small forces.

Accordingly, it is highly desirable that a safety and arming system be devised applying electronic techniques rather than mechanical devices to perform integration operations upon an acceleration signal derived from an accelerometer to obviate some of the more troublesome disadvantages of prior art systems having a comparable objective of measuring safe arming distance from detected measurements of acceleration.

Moreover, it is highly desirable that such electronic techniques be adapted for use with digital signals and digital logic rather than analog electronic signals for the reason that digital techniques are amenable to the inclusion of fail-safe logic in the system so that extraneous, erroneous, or external signals can be detected so as to prevent inadvertent arming of the device by initiating procedures to either reset or "dud" the missile in which the safety and arming system is employed.

SUMMARY OF THE INVENTION

In addition to incorporating fail-safe electronic logic as an inherent feature of the present invention to minimize a premature arming signal which may result from extraneous voltages due to high radiation sources, noise, or other unwanted electrical interference, the present invention includes multiple safety features.

The complete safety and arming system of the present invention primarily includes basic sub-assemblies comprising (1) an accelerometer for developing a signal as a function of the acceleration it undergoes, (2) electronic logic circuitry including apparatus for producing a digital output representative of velocity in response to an intial acceleration signal as well as logically arranged electronic elements for performing iterative integration on digital signals, and (3) a fail-safe arming mechanism.

In the system there is an arming path, operative upon actuation, for detonating the missile. Such a path may typically comprise, an explosive train, which may be actuated by an electric detonator connected to receive a signal such as a target detection indication confirming that a guidance system has homed in on a target. The arming path is rendered safe from inadvertent detonation by a spurious signal, for example, through the technique causing a discontinuity in the path, such as may be given effect, for example, by the lateral displacement of a portion of an explosive train so that the missile is not truly armed until the laterally displaced portion is realigned to provide a continuous arming path.

In a typical system this discontinuity could be provided by an arming slider member which includes the laterally displaced portion of the explosive train. In a preferred embodiment of the present invention the arming slider member is retained in the laterally displaced position to render the explosive train inoperative and retain the missile in its unarmed state by two interlocks; the first of the interlocks may take the form of a launch interlock such as a member which is solenoid operated and can only be withdrawn from its interlock position retaining the arming slider member by the actuation of an "intent-to-launch" switch, for example, which impresses electrical energy upon the solenoid and removes the intent-to-launch interlock from a detent in the arming slider member.

In a preferred embodiment of the present invention the same intent-to-launch interlock (which incidentally operates independently of the second interlock) can also be made to release the accelerometer from a locked condition under which it is inoperative to respond to acceleration forces and enable an electrical circuit responsive to accelerometer signals. The same actuation caused by closure of the intent-to-launch switch can perform the additional function of applying power to the missile system.

A second independently operative interlock comprises a minimum boost sensor which, in its normal position at rest, interlocks in a detent of the arming slider member preventing its movement laterally and maintaining the discontinuity in the explosive train so that the missile is not armed. Upon launch of the missile, a minimum boost sensor, which may take the form of a spring-loaded mass disposed to respond to the launch acceleration of the missile, is displaced by a predetermined and precalculated minimum boost or acceleration, removing the interlock from the arming slider member so that the slider member is in a condition to be laterally moved against its spring loading force for aligning the explosive train in a continuous path and thus arming the missile. The arming slider member, however, is normally retained in the unarmed position by suitable spring loading bearing against one of its ends.

The accelerometer, having been enabled by closure of the intent-to-launch switch, responds to the acceleration forces developed by launching of the missile generating an electrical signal as a function of such acceleration forces by means of, for example, a potentiometer having a variable tap carried on the accelerometer and moved relative to the resistive element of the potentiometer. In the preferred embodiment of the present invention a variable tap is normally at the center of the resistive element of the potentiometer developing a balanced signal and movement of the accelerometer in response to acceleration forces causes an unbalanced signal to be developed by the potentiometer.

The signal thus developed in response to acceleration forces is employed in electronic logic circuitry to develop a digital signal over a predetermined time increment. The digital signal is thus the time integral of acceleration and representative of velocity attained. The digital velocity signal is then integrated to provide a digital signal indicative of the distance traveled by the missile. The digital distance signal is compared to a reference signal for determination of whether the missile has traveled a predetermined safe arming distance. If the digital distance signal is equal to the predetermined reference signal, the missile is at a safe distance from the launch vehicle to be armed.

The final step in arming the missile is achieved by actuating a fail-safe mechanism which aligns the explosive train. The fail-safe feature of this final step is that the arming mechanism is such as to require two precisely simultaneous signals in order to arm the missile. If only one signal is generated, due to a spurious false signal source, the mechanism is such that it will be retained in a non-arming condition thereby preventing arming of the missile in response to such spurious or false signals as may be developed inadvertently in electronic circuitry.

The safety and arming system of the present invention employs a unique method and means for developing a digital signal representative of velocity which is generated from an acceleration signal provided by the accelerometer. An up-down digital counter is arranged to be under the control of a square wave, counting up when the square wave is positive and down when the square wave is not positive. When the square wave is symmetrical having positive and non-positive portions of equal duration, the net count for the full cyclic period or time increment of the square wave cycle is zero because the up-down counter first counts up and then down an equal number of counts. The zero net cumulative digital count is normally the situation when there is no acceleration.

However, upon launch the acceleration which is detected is employed to cause a commensurate state of imbalance between the duration of the positive portion of the cycle of the square wave generator and the duration of the non-positive portion of the square wave generator. As a result, the up-down counter which the square wave generator controls is caused to count up in excess of the down count during the predetermined time increment, subtracting the down-count from the up-count so that the net cumulative count in the digital counter at the end of each cyclic period of the multivibrator is a digital count of the time integral of acceleration, representative of the velocity achieved during the period of acceleration. The acceleration forces have been effectively measured over a time period thereby integrating the measured acceleration to yield a digital output representative of velocity.

This unique method and means of employing an acceleration signal to develop a digital output signal which is a measure of velocity achieved during the period of acceleration, has a number of advantages in addition to the fact that its output is in digital form. One of these advantages is the fact that the concept is capable of developing a digital output which is negative in character; that is to say, the down-counts may be in excess of the up-counts during a particular time increment so that the resultant negative count is indicative of negative acceleration or deceleration and a resultant loss in velocity. The negative digital signal can then be subtracted from a prior velocity signal to ascertain the current velocity in digital terms.

Accordingly, the concept and teachings of the present invention embrace multiple advantages, several of which reside in sub-assemblies of the system, apart from the overall system itself.

It is a primary object of the present invention, therefore, to develop an improved method and means to provide a digital output signal derived from an acceleration signal over a determinable time increment representative of the time integral of such acceleration as a digital measure of velocity.

An equally important object of the present invention is to provide for digital electronic iterative integration of an acceleration signal for generating a digital signal as a measure of distance traveled during the period of acceleration.

A further important object of the present invention is to provide a significantly improved safety and arming system employing digital electronic techniques.

Yet another important object of the present invention is to provide a digital electronic safety and arming system including multiple safety interlocks which are independent of each other and are responsive to separate, independent, actuation forces.

Another most important object of the present invention is to provide a digital electronic safety and arming system in which the final step of arming is achieved by a fail-safe procedure.

A further object of the invention is to provide a fail-safe arming procedure which will abort the arming when spurious, false signals are developed and lock the arming device in a non-arming condition.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
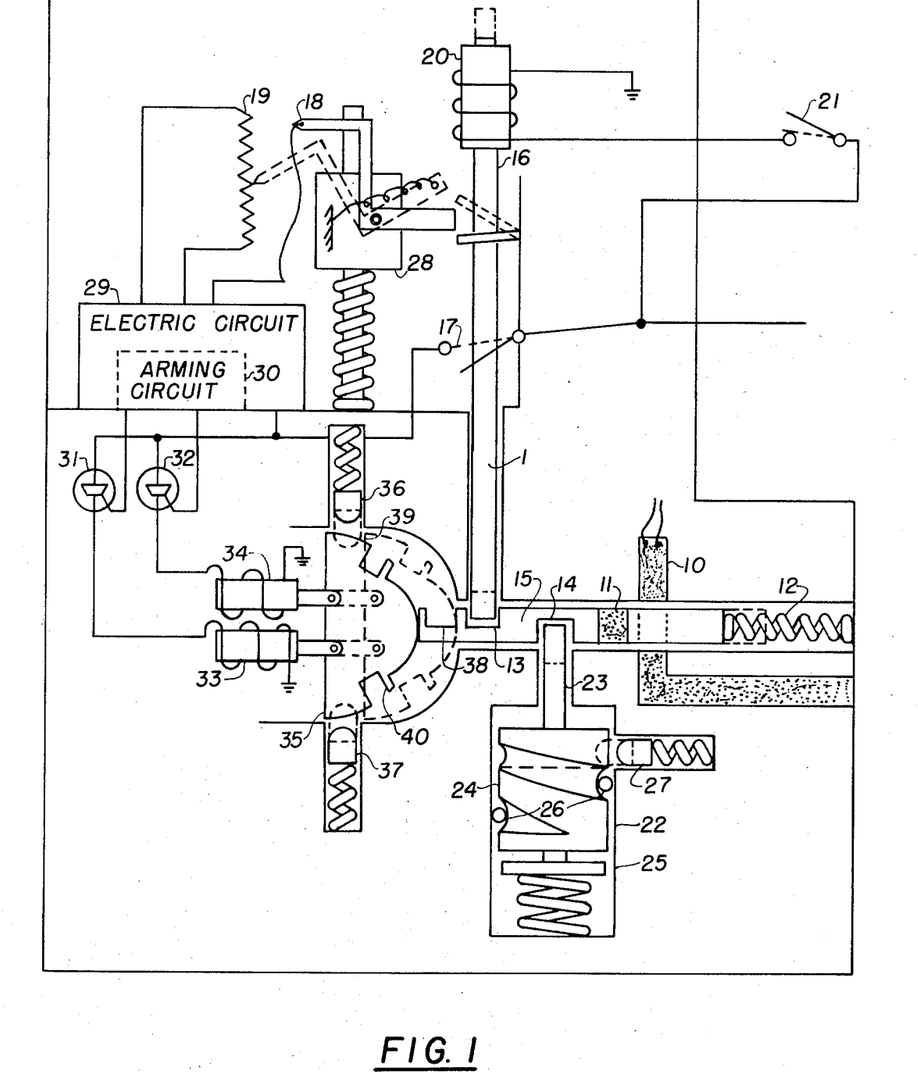
FIG. 1 is a partially cross-sectional, schematic illustration of of the digital electronic safety and arming system of the present invention in different stages of its operation.

FIG. 1 schematically illustrates an embodiment of the digital electronic safety arming system of the present invention in its initial and unarmed state, indicated by the solid line representation of its movable elements. The final state and positions of movable elements resulting from the arming sequence is shown by dash-line representation.

The unarmed state of the system is caused by a discontinuity in an arming path 10 which, in this case, may take the form of a laterally displaced portion 11 of an explosive train, for example. The laterally displaced portion 11 of the explosive train 10 is maintained in the unarmed position by a spring 12 and two interlocks received into two different detents 13 and 14 of an arming slider 15. The displaced portion 11 of the arming path 10 prevents detonation of the arming path beyond the arming slider 15.

Therefore, the system (as shown by the solid lines depicting its elements) may be said to illustrate its unarmed condition. The first interlock comprises a solenoid actuated rod 16 which performs several functions in addition to its interlocking function with the detent 13. In its non-actuated position as shown by the solid line representation in FIG. 1, the interlock assembly 16 maintains a power switch 17 in an open condition as well as retaining a variable tap 18 from contacting the stationary resistive element 19 of a potentiometer thereby avoiding the development of an unwanted spurious, signal.

The solenoid 20 is actuated by the closure of switch 21, as shown by the dash lines, which delivers electrical energy to the coil of the solenoid 20 causing the rod 16 of the interlock means to move in an upward direction to the position indicated by dash lines. The upward movement of rod 16, as shown by the dash lines, withdraws the end of the rod interlock 16 from the interlock detent 13 and at the same time closes the switch 17, as indicated by its dash line representation, for connecting power to the remainder of the missile system. The same actuation moves the variable tap 18 to the position represented by the dash lines into contact with the stationary portion of a potentiometer which is in the form of the resistive element 19. The switch 21 may be referred to as an "intent-to-launch" switch and is actuated in an aircraft, for example, as a step necessary prior to launching the missile.

When the missile is launched, assuming an upward direction relative to the drawing of FIG. 1, acceleration forces are developed which operate upon the second interlock 22 having a rod 23 supported on the mass 24 which is urged upwardly by the spring 25. The mass of element 24 and rod 23, and the force of spring 25 are pre-calculated, together with frictional forces, so that a predetermined minimum acceleration or boost must be achieved by the missile in order that the mass travel along a helical path 26 translate past the lock-out detent 27 to the position indicated by dash line representation. This is the second step in the arming sequence of the present system and it should be noted that the two interlocks are independently operative and respond to separate and different actuating forces.

The accelerating forces also operate upon an accelerometer 28 carrying the variable tap 18 which is in contact with the stationary resistive element 19 of a potentiometer. When the accelerometer 28 is at rest, i.e., not subject to acceleration forces, the tap 18 is normally in the center of the resistive element 19. However, as the accelerometer 28 responds to accelerating forces, it causes the tap 18 to be moved along the potentiometer away from its mid-point to generate an unbalanced signal as a function of the acceleration. The unbalanced signal operates in conjunction with electronic circuitry 29 to develop a digital signal which is the time integral of the acceleration and therefore represents the velocity developed by the missile during the period of acceleration.

The electronic circuitry 29 then integrates the digital velocity signal to provide a digital signal which is a function of the distance traveled by the missile. The digital distance signal is compared in an arming circuit 30 with a reference signal representing a predetermined safe distance at which the missile may be armed. When the safe distance is reached, as determined from the fact that the digital distance signal equals the reference signal, the arming circuit 30 delivers simultaneous signals to control means, such as transistors 31 and 32, applying power to dual arming devices which may take the form of the solenoids 33 and 34 as illustrated.

Simultaneous actuation of solenoids 33 and 34, as shown by dash lines, drives an arming cam 35 forward, as indicated by dash lines, positioning the arming slider 15 to its armed position as represented by dash lines, so that the discontinuity in the explosive train 10 is eliminated by realignment of the originally laterally disposed portion 11. The continuity of the arming path 10 is maintained by the retention of the arming cam 35 in its actuated position by appropriate lock detents 36 and 37, which move to their locking position represented by dash lines, and also by the interlock 16 dropping into a third detent 38 in the arming slider 15.

One of the features and advantages of the present invention is the fail-safe nature of the arming mechanism by reason of which it requires precisely simultaneous signals from the arming circuit to effectuate the final arming step of the missile.

Figure 1A:
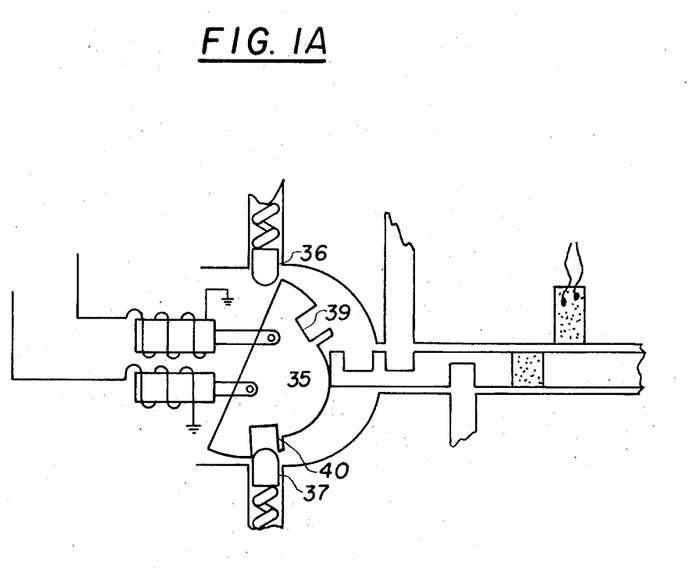
FIG. 1a is an illustration of the operation of one of the fail-safe features of the present invention.

If, for example, a spurious or false signal is developed in the electronic integrating circuitry 29, or the arming circuit 30, a single solenoid will be actuated. This results in the rotational pivoting of the arming cam 35 as illustrated in FIG. 1a so that it does not perform its arming function but rather is locked into an unarmed condition by either the detent 36 being received into recess 39 or the detent 37 being received into a recess 40, (as shown in FIG. 1a), depending upon which way the arming cam is rotated. The direction of such pivotal movement is determined by which one of the two arming solenoids is actuated, and, as can readily be appreciated, the arming sequence is aborted and the arming cam 35 locked in an unarmed position.

Figure 2:
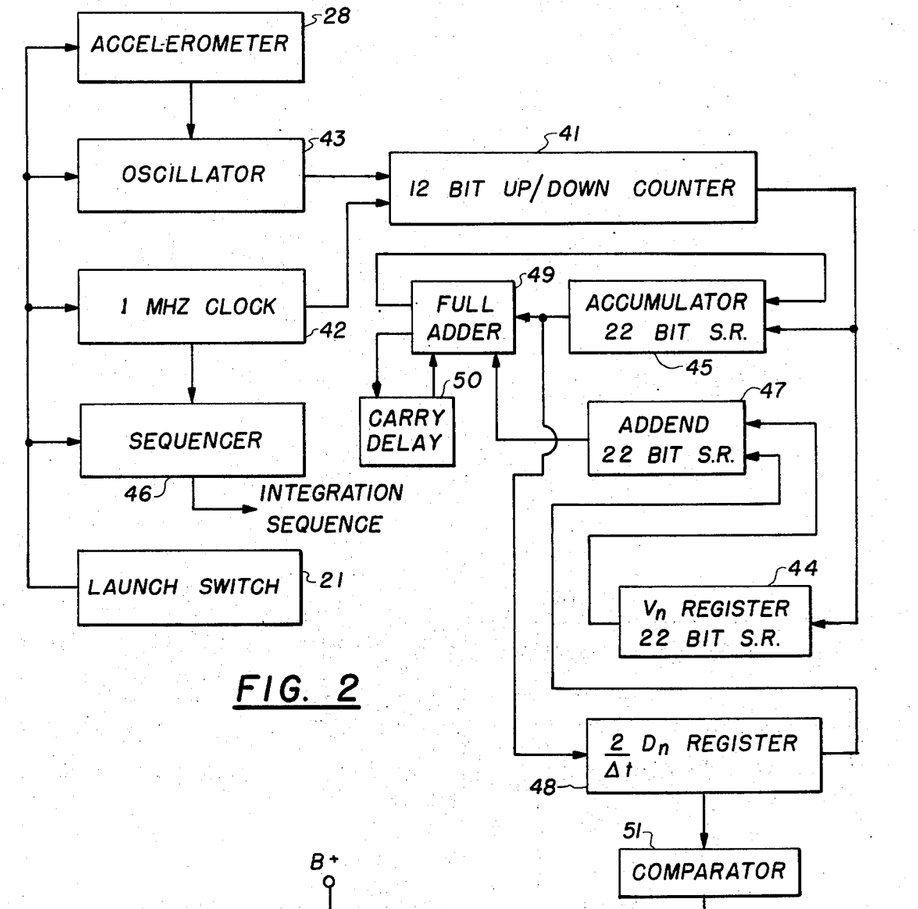
FIG. 2 is a schematic block diagram of the digital electronic portion of the system of the present invention.

The digital electronic integrating circuit represented at 29 in FIG. 1 is shown in the more detailed schematic illustration of FIG. 2. An up-down counter 41 receives two inputs; one input is developed by the clock 42 which, in one embodiment of the present invention, was operative at 1 MHz; the other input is generated by an oscillator 43 which, in a typical embodiment, was operative at a frequency of 1 KHz. Oscillator 43 is used to develop a square wave output, a positive portion of which controls the counter to count the clock pulses additively up and the non-positive portion of the square wave being employed to cause the counter to count down, subtractively. The oscillator 43 is of such design that it is responsive to a signal developed by co-action the accelerometer 28 of FIG. 1 displacing the variable tap 18 along the stationary resistive element 19.

The oscillator 43 generates square wave output signals of constant frequency, i.e., equal duration cyclic periods, but having positive and non-positive square wave portions varying in duration in accordance with the signals developed by the accelerometer 28 in its effect upon the tapped signal produced by positioning the variable tap 18 on the resistive element 19. That is to say, that when the accelerometer develops no signal, the oscillator will generate a square wave having positive and non-positive portions of equal duration, thus causing the counter 41 to count up and down an equal number of constant frequency pulses received from clock 42 so that its net cumulative digital count is zero in response to the zero acceleration.

However, when the accelerometer is responsive to acceleration forces and develops an output signal indicative thereof, the oscillator 43 will develop positive excursions of the square wave which are longer in duration, while the non-positive portions of the square wave are diminished by a commensurate period of time. Thus, the up-down counter 41 is caused to count a commensurate number of clock pulses up and down so that there is a net cumulative digital pulse count produced because the up-down counter functions so that the number of down counts within a cyclic period effectively subtracts from the up counts previously accumulated during the same cyclic period. Since the frequency of oscillator 43 remains constant, there is a known determinable time increment of one cyclic period over which the up-down count has been made. The net digital up-down count generated in response to acceleration over a known time increment in the case of the illustration of FIG. 2 would be one millisecond since the oscillator 43 is operative at 1 KHz. The net count remaining in the counter 41 at the end of the time increment therefore is the time integral of the acceleration, or velocity achieved during that time increment. The count is then delivered to the $V_n$ register 44 and an accumulator 45.

In accordance with the concept of the present invention the separation distance from the launch vehicle is computed by using an iterative integration technique. The missile velocity relative to the launch vehicle is available from the up-down counter 41 as previously explained; therefore, only one successive integration is necessary to compute distance.

The technique employed within the concept of the present invention assumes that the acceleration is constant over one time period iteration. Since the time period iteration is relatively very small as, for example, the one millisecond period as developed by the oscillator 43 in the embodiment illustrated in FIG. 4, a further assumption may be made that the change in distance during the iteration period is equal to the average of the former velocity (one time iteration earlier) and the present velocity multiplied by the time increment. This may be expressed as:

$$D_{n+1} = D_n + (V_n + V_{n+1}) \Delta t/2 \quad (1)$$

where:

$D_{n+1}$ = present distance $D_n$ = previous distance (one time iteration earlier)

$V_n$ = previous velocity $V_{n+1}$ = present velocity $\Delta t$ = iteration time As may be noted from equation (1) two additions, one multiplication, and one division are necessary to compute distance however, equation (1) may be rewritten in the form of equation (2):

$$(2/\Delta t)D_{n+1} = (2/\Delta t)D_n + (V_n + V_{n+1}) \quad (2)$$

It then is apparent that only two additions are necessary to calculate distance for comparison with a reference signal which is representative of a predetermined safe distance for arming, provided that the predetermined reference signal is scaled by the value $2/\Delta t$.

The electronic circuits necessary to carry out these calculations are illustrated schematically in FIG. 2. A MHz clock 42 which may be of the solid state crystal type provides constant frequency signals to an up-down counter 41; a sequencer 46 develops signals for controlling the sequence of operations of the calculating portion of the circuitry which includes four shift registers, the accumulator 45, the addend register 47, $V_n$ register 44, and the $2/\Delta t$ $D_n$ register 48. In a typical embodiment each of the four shift registers previously mentioned may have a twenty-two bit capacity or the equivalent of a decimal capacitor of about $4 \times 10^6$.

In the combination of apparatus employed in the embodiment illustrated in FIG. 2, a distance measurement capacity of about 2,000 feet is provided, i.e., ($2,000 \times 2/\Delta t = 2,000 \times 2/0.001 = 4 + 10^6$).

The accumulator 45 and the $V_n$ register 44 are parallel input/serial output types because they are required to accept parallel data from the up-down counter 41. The addend register 47 and the $D_n$ register 48 are serial in/serial out type.

As was previously described, the oscillator 43 is of a type which provides a constant frequency output, preferably in the form of a square wave wherein the respective duration of its two different values are simultaneously changed in opposite sense within cyclic periods of constant duration, and such changes in the durations of its two different values are generated as a function of the input signal developed by the accelerometer 28.

Figure 3:
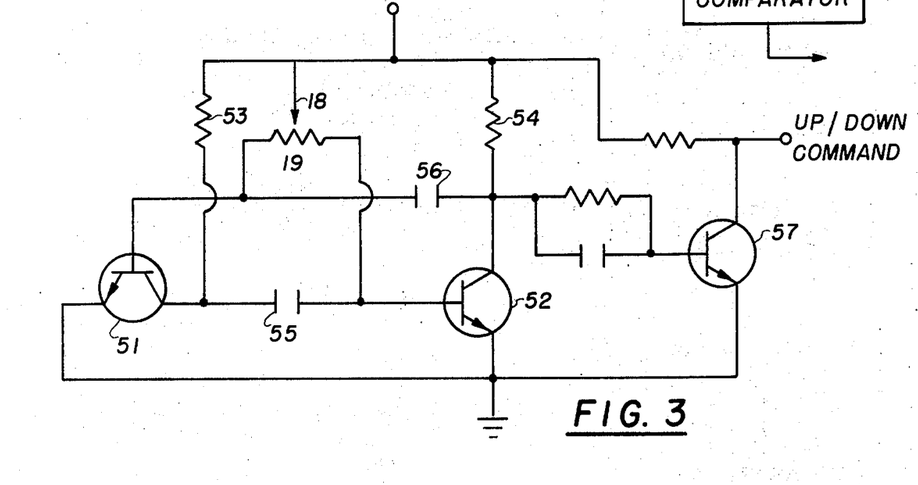
FIG. 3 is a schematic wiring diagram of the oscillator employed in the digital electronic portion of the invention.

The oscillator 43 is illustrated in FIG. 3 and operates in the following manner. Transistors 51 and 52, together with resistive elements 53 and 54, and capacitors 55 and 56, comprise a free-running multivibrator oscillator having the bases of the transistors connected to a common resistive element 19 which, in turn, is connected to a B+ voltage through a variable tap 18.

A third stage of the circuit illustrated in FIG. 5 comprises a transistor 57 which is an up-down command control connected to the up-down counter 41.

Figure 4A:
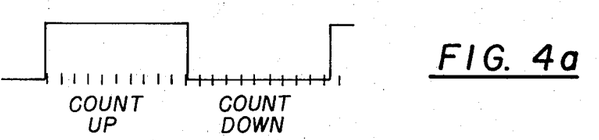
FIGS. 4a and 4b are illustrations of the type of waveforms generated by the oscillator of FIG. 3.
Figure 4B:
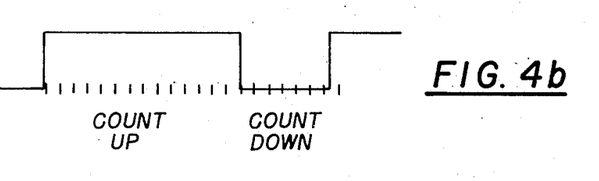

When the circuit, as illustrated in FIG. 3, is in the condition where variable tap 18 is at the center of the resistive element 19, a square wave will be developed at a frequency of 1 KHz wherein the crossover of the waveform from a first value, such as a positive voltage, to a second value, such as zero voltage, will occur at the middle of each cyclic period as is illustrated in FIG. 4a. However, when the accelerometer 28 of the arming system is actuated by acceleration forces and consequently moves the variable tap 18 along the stationary resistive element 19, a state of imbalance is created and results in a square wave of the same frequency, but which is imbalanced in the sense that the positive signal has a longer duration than before and the crossover where the square wave changes from positive to negative-going condition is displaced from the midpoint within the cyclic period of the signal, as is illustrated in FIG. 4b. Thus, the command signal delivered by the control transistor 57 controls the sense of the count of the up-down counter 41 so that it counts up at a constant rate for a greater duration of time than it counts down, thereby leaving a net cumulative count within such cyclic period.

On the other hand, if the accelerometer 28, having been initially actuated by acceleration forces, then undergoes subsequent deceleration forces, a state of imbalance is developed in the other sense, generating a net negative count, so to speak, representative of the diminishing velocity occurring during the period of deceleration. Such signal, representative of a diminishing velocity, may then be subtracted from the prior positive velocity, and the remainder is a digital signal representative of net current velocity.

When there is no acceleration, the circuit of FIG. 3 will be in a state of balance so that the up-down counter 41 will be controlled to count up and down for equal periods of time and therefore produce a zero net digital count indicative of zero velocity. In its operation, the circuit of FIG. 3 is arranged so that when the acceleration signal is applied to the resistive element 19, the resistance on one side of the oscillator will increase and on the other side of the oscillator it will decrease. Both these changes are linear and therefore the frequency and periodic cycle of the oscillator remain the same; however, the duration of the time during which the oscillator is generating a positive output voltage differs from the duration of time when it is generating a zero voltage output, and such difference is a function of the magnitude of acceleration. Obviously the greater amplitude of acceleration, the larger the time difference will be between these two conditions and accordingly the larger net cumulative count will be developed by the up-down count.

Since this count is developed over each cyclic period of the oscillator of FIG. 3, it is representative of the time integral of acceleration which is equal to velocity.

Thus, up-down counter 41 develops a signal which is a measure of velocity for each time increment, i.e., each repetitive cyclic period of the oscillator 43. As previously described, such net cumulative count at the end of each cyclic period or predetermined time increment is delivered from the up-down counter 41 to the accumulator 45 and also to the $V_n$ register 44.

The sequence and steps of operation of the digital electronic circuitry is controlled by a sequencer 46 connected to deliver command sequence signals to the electronic circuitry of FIG. 4 in the following manner. The clock pulses, as derived from the 1 MHz clock 42, are connected to the sequencer which is programmed to repetitively develop a repetitive sequence of signals in the following order. The initial commands of the sequencer 46 cause transfer of the content of the up-down counter 41 to the accumulator register 45 and also to the $V_n$ register 44. This places the most recent value of velocity, as represented by a net digital count, in a position to enter into the computations for a particular iteration.

Then a sequence command is given to shift right enable the adder 49, a standard single bit serial adder which is used for all additions. A serial adder may be employed rather than a parallel type, because it is less expensive and its relatively slow add time of operation can be tolerated for this type of function. The numbers to be added are delivered from the accumulator register 45 and the addend register 47, received by the adder 49 one bit at a time, and the sum output of the adder 49 is recirculated into the accumulator register 45. This step adds the previous value of velocity to the most recent value of velocity to give a new average velocity (scaled by 2).

Next, the sequencer 46 gives the command to transfer the contents of the $D_n$ register 48 to the addend register 47. This prepares the previously calculated value of separation distance (as scaled by $2/\Delta t$) for summing with the average velocity. Then, the adder 49 receives a shift right enable signal which adds the previous value of accumulated separation distance (scaled by $2/\Delta t$) to the new average velocity.

The next sequence command transfers contents of the accumulator register 45 to the $D_n$ register 48 which stores the currently calculated value of separation distance (scaled by $2/\Delta t$) for use in the next iteration during the next successive time increment.

The next step in the sequence of commands developed by the sequencer 46 causes a comparison of the digital value in the $D_n$ register 48 with the predetermined value or digital count which is representative of a pre-calculated safe arming distance. This is accomplished in comparator 51 and when the digital count (scaled) transferred from the $D_n$ register 48 is equal to the predetermined digital count (also scaled) representative of a pre-calculated safe arming distance stored in comparator 51, an arming signal is delivered as an output of comparator 51.

The next successive step commanded by the sequencer 46 is the transfer of the contents of the $V_n$ register 44 into the addend register 47. This step stores the current velocity measurement for computation use in the next iteration.

Appropriate resetting of the sequencer 46 is then accomplished. After the completion of an iteration cycle, the previously described sequence will be restarted by the sequencer 46, the sequence of the previously described steps of calculation having been completed in less than one cyclic time period of the oscillator 43 which is 1 millisecond. Upon the beginning of a new iteration period, the computations are repeated with the new value of calculated missile velocity and the updated value of distance.

In order to determine if the computed distance is equal to the pre-calculated safe arming distance, a comparison is made for each iterative time period. If desired, only the most significant bit in the $D_n$ register 48 may be checked and if it is a logical "one," then an arming signal may be initiated. However, if more accuracy is required, more of the most significant bits in the $D_n$ register 48 can be compared with the digital signal stored in the comparator 51 which is representative of the pre-calculated safe arming distance.

The pre-calculated safe arming distance may be inserted into the comparator 51 immediately prior to launch which would allow the predetermined safe arming distance to be changed in accordance with any particular situation or special requirement.

A technique for preventing premature arming of the missile may be employed by checking the most significant bit position of the $D_n$ register 48 during each clock output pulse from the sequencer 46. If the bit which is checked in the $D_n$ register 48 is a logic "1" at any time during the computation sequence, (except when a number is being entered into the $D_n$ register 47, or when an actual comparison is being made) then it may be assumed that an extraneous, spurious signal has appeared.

In that event, the system will deliver but a single signal to only one of the two arming actuators, such as the solenoids 33 and 34, depending upon which one is connected to the output of the comparator 51. The arming cam 35 will therefore be pivotally displaced, aborting arming of the missile and locking the arming cam 35 in a non-arming condition as is illustrated in FIG. 1a.

If, however, the proper signals for arming are developed in accordance with the operation of the system, there will be a logic "1" pulse from both the comparator 51 and from the sequencer 46 into the arming actuators 33 and 34, simultaneously acting upon the arming cam 35 to arm the missile in the manner previously described by realigning the arming path to eliminate its discontinuity.

One of the more significant advantages of the digital electronic safety arming system of the present invention is that it is capable of performing double integration upon an acceleration signal to determine separation distance in response to any missile acceleration time profile, including the case of negative acceleration which can occur during missile flight. By contrast all known, currently used mechanical safety and arming systems are not capable of operating with low or negative accelerations.

Further because the present invention does not use any mechanical components in its acceleration double integration calculations, it virtually eliminates all inaccuracies due to friction, out of tolerance parts, lubrication problems, inertia, vibrations, and other potential problems associated with mechanical devices.

By employing digital logic to iteratably integrate acceleration, a high order of accuracy can be achieved. Inherently, the accuracy of computed separation distance in the use of the system of the present invention depends principally upon the accuracy of the accelerometer employed and very little upon the digital circuitry.

For example, employing a reasonably accurate integration technique and a relatively small iteration time of the order of 1 millisecond, the electronic processing and calculation of the present invention is very precise. If an accelerometer with an accuracy of ± 3 percent is used, it is readily feasible that the calculated separation distance accuracy will be better than ± 5 percent. This is in comparison to the average mechanical integrating system of the prior art wherein the accuracy is of the order of ± 25 percent.

A further advantage in the use of digital logic which is inherent in the concept of the present invention is the availability of integrated circuits to perform logic functions. Integrated circuits are small, rugged, reliable, and, as is well known to those skilled in the pertinent arts, can operate over a broad required temperature range of, for example, −55° C to 120° C.

A further important feature of the use of digital logic in the form of integrated circuits is their potential low cost. As integrated circuits are coming into greater and greater demand, production will be increased resulting in a decreased cost per unit as has been reliably predicted by the electronics industry.

A significant advantage of the concept of the present invention is that it readily lends itself to many alternative embodiments and the use of different elements as designed within its concept and teaching. For example, a rocket motor pressure sensor rather than a G-time sensor could be used to insure that a minimum boost had occured, and thus be employed to remove the second interlock from the arming mechanism.

Another alternative within the concept and teaching of the present invention is that a launch ejection sensor could be used other than an electronic solenoid so as to actuate the first interlock and the arming sequence would thus be started upon the indication that launch had occurred.

Additionally, fail-safe logic could be readily adapted and used in the digital circuitry for zeroing all the registers if extraneous or incorrect voltages were detected at any point in the calculation.

If desired and permitted by cost considerations, a doubly safe system could be readily devised employing dual independent accelerometers and integrator circuits.

Further, many appropriate additional sources of information such as minimum air velocity, for example, or a signal indicative of the fact that a missile guidance system had become operative could be employed in an AND gate of the arming logic to further enhance safety.

Obviously many modifications and variations of the present invention are possible in the light of the above teachings. It is therefore to be understood that within the scope of the appended claims the invention may be practiced otherwise than as specifically described.

What is claimed is:

1. An apparatus for producing a digital output representation of velocity in response to an acceleration signal developed during a determinable fixed time period comprising:

an up-down binary counter;
a source of constant frequency signals connected as an input to said counter;

a signal source producing first and second alternate states normally of equal duration within repetitive cycles of said determinable fixed time period, and being connected to said binary counter for causing an up count of said constant frequency signals during one of said states and a down count curing the other of said states;

an accelerometer for producing an electrical signal as a function of its instantaneous acceleration;

said electrical signal being connected to said signal source for producing changes of opposite sense in the respective duration of said first and second states without changing said determinable fixed time period;

whereby the net count accumulated by said counter is the time integral of acceleration during each said determinable fixed time period, and is representative of velocity.

2. An apparatus for producing a digital output representative of distance in response to an acceleration signal developed during a determinable fixed time period, including the apparatus as claimed in claim 1 and further comprising:

means for integrating said net count over an additional time period for producing an output signal as a function of the distance traveled during said time periods.

3. An apparatus for producing a digital output representative of velocity as claimed in claim 1 wherein said signal source producing first and second states is a square wave generator.

4. An apparatus for producing a digital output representative of velocity as claimed in claim 3 wherein said square wave generator is a free-running multivibrator having two symmetrically identical stages of electrical elements including a commonly connected resistive element.

5. An apparatus for producing a digital output representative of velocity as claimed in claim 4 wherein said accelerometer displaces a variable tap on said commonly connected resistive element to produce said electrical signal as a function of instantaneous acceleration.

6. A method for providing a digital count representative of the time integral of acceleration over a determinable fixed time increment comprising the steps of:

generating electrical signals alternating between first and second states within a constant cyclic period equal to the determinable fixed time increment and having a cross-over between the two states normally at the mid-point of each cyclic period;

causing time displacement of the cross-over within the constant cyclic period responsive to a detected acceleration;

applying constant frequency signals of higher frequency to a digital counter capable of counting additively and subtractively; and, controlling the additive count in the digital counter in response to the first state of the electrical signals, and controlling the subtractive count in the digital counter in response to the second state of the electrical signal.

7. A method as claimed in claim 6 wherein the electrical signals alternating between first and second states within a constant cyclic period are in the form of square waves.

8. A method as claimed in claim 7 wherein the square waves are formed by alternate states of positive potential and substantially zero potential.

9. A method as claimed in claim 6 including the further step of resetting the digital counter after each cyclic period.

10. A method as claimed in claim 6 including the further step of averaging the digital count for two successive time increments to produce a digital count representative of average velocity over the second time increment.

11. A method as claimed in claim 6 including the further step of integrating the digital count representative of the time integral of acceleration over an additional identical time increment to provide a digital count representative of the distance traveled during the period of acceleration.

* * * * *